United States Patent
Repton et al.

(10) Patent No.: US 9,768,688 B2
(45) Date of Patent: Sep. 19, 2017

(54) ASYMMETRIC INDUCTORS IN MULTI-PHASE DCDC CONVERTERS

(71) Applicant: Dialog Semiconductor GmbH, Kirchheim/Teck-Nabern (DE)

(72) Inventors: Andrew Repton, Swindon (GB); Hidenori Kobayashi, Kawasaki (JP); Mark Childs, Swindon (GB); Jindrich Svorc, Swindon (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 120 days.

(21) Appl. No.: 14/052,844

(22) Filed: Oct. 14, 2013

(65) Prior Publication Data
US 2015/0097542 A1    Apr. 9, 2015

(30) Foreign Application Priority Data
Oct. 7, 2013  (EP) ..................................... 13368040

(51) Int. Cl.
*H02M 3/158* (2006.01)
*H02M 1/00* (2006.01)

(52) U.S. Cl.
CPC ......... *H02M 3/158* (2013.01); *H02M 3/1582* (2013.01); *H02M 3/1584* (2013.01); *H02M 2001/0032* (2013.01); *Y02B 70/16* (2013.01)

(58) Field of Classification Search
CPC ............... H02M 3/158; H02M 3/1584; H02M 2003/1586; H02M 3/1588
USPC ........................................ 323/225, 271, 272
See application file for complete search history.

(56) References Cited

U.S. PATENT DOCUMENTS

| | | | |
|---|---|---|---|
| 7,199,695 B1 | 4/2007 | Zhou et al. | |
| 7,449,867 B2 | 11/2008 | Wu et al. | |
| 7,468,899 B1 * | 12/2008 | Hopper et al. | 363/147 |
| 7,791,321 B2 | 9/2010 | Xu et al. | |
| 8,063,617 B2 * | 11/2011 | Wang | H02M 3/1584 323/272 |
| 8,896,280 B2 * | 11/2014 | Tang | H02M 3/1584 323/269 |
| 2005/0093525 A1 * | 5/2005 | Walters et al. | 323/272 |
| 2011/0169476 A1 | 7/2011 | Ikriannikov et al. | |

(Continued)

FOREIGN PATENT DOCUMENTS

EP    2 555 399    2/2013

OTHER PUBLICATIONS

European Search Report 13368040.5-1804 dated May 30, 2014, Dialog Semiconductor GmbH.

*Primary Examiner* — Gary L Laxton
(74) *Attorney, Agent, or Firm* — Saile Ackerman LLC; Stephen B. Ackerman

(57) ABSTRACT

A multi-phase DC-to-DC converter is configured to achieve fast transient response and to optimize efficiency over the load range. Phase shedding changes the active number of phases according to output currents. Each phase of the converter has an inductor configured to optimize the efficiency for a range of load currents in which that phase is used. A converter may have 3 phases, the first used only in sleep mode and has a large inductance with low AC losses, the second used in sync mode at low currents and having a lower inductance with low AC losses, the third phase is used in sync mode at high currents and has small inductance with low DC losses. The number of phases is ≥2.

26 Claims, 4 Drawing Sheets

(56) References Cited

U.S. PATENT DOCUMENTS

2013/0027009 A1      1/2013   Tang et al.
2013/0293207 A1*   11/2013   Wei et al. ..................... 323/272

\* cited by examiner

ASYMMETRIC INDUCTORS IN MULTI-PHASE DCDC CONVERTERS

TECHNICAL FIELD

The present document relates to DC-to-DC converters. In particular, the present document relates to using asymmetric inductors in multi-phase, multi-operation mode-converters.

BACKGROUND

It is common to use same type of inductors for each phase of multi-phase buck converters; it is also common to use a same type of inductors for each phase to maximize the merit of multi-phases, such as better transient response, smaller ripple and less harmonic noise. However, this may not be an optimum solution in terms of efficiency, if one needs higher efficiency over a wide range from light load to heavy load.

It is commonly known that smaller value inductors give faster transient response, and that larger value inductors have low AC losses, which gives high efficiency at light load condition. Mixing different inductance values, sizes and types is not common, and would not give a benefit unless the buck architecture is adapted to using different inductance values.

Multi-operation modes of DC-to-DC converters include sleep mode often pulse-frequency modulation (PFM) mode and sync mode often pulse-width modulation mode (PWM).

SUMMARY

A principal object of the present disclosure is to achieve both high efficiency and fast transient response of a DC-to-DC converter and to optimize the efficiency over the load range of a converter, both in sleep (PFM) and in sync (PWM) mode.

Another principal object of the present disclosure is to optimize DC-to-DC converter efficiency and transient response performance by combining types of inductors appropriately.

A further object of the disclosure is to optimize DC-to-DC converter efficiency and transient response performance for use in multi-phase converters.

A further object of the disclosure is to optimize DC-to-DC converter efficiency and transient response performance for use in in DC-to-DC converters where not all phases are used in sleep mode (for low load currents) or in multi-phase converters which apply phase shedding operation, wherein phase shedding changes the active number of phases according to the output current.

A further object of the disclosure is to optimize DC-to-DC converter efficiency and transient response performance for use of inductors having two different inductances.

Moreover an object of the disclosure is to apply the methods and circuits disclosed for a buck converter.

A further object of the disclosure is to optimize buck converter efficiency and transient response performance for use of inductors having more than two different inductances.

In accordance with the objects of this disclosure a method to achieve both high efficiency and fast transient response of a multi-phase DC-to-DC converter and to optimize the efficiency over the load range of the buck converter has been achieved. The method disclosed comprises the steps of: providing the multi-phase converter, deploying at least two circuit branches to the buck converter, wherein each branch comprises a pulse generator and inductive means, wherein all branches are jointly connected to an output node of the buck converter, wherein all branches are connected in parallel and wherein one or more branches activated together correspond to an operation phase of the buck converter, wherein activation of one or more branches is assigned to a dedicated operation phase which is dependent upon a load current, and configuring an inductance of the inductive means of each branch in order to optimize the efficiency for a range of load current in which the branch is assigned to, wherein the inductance of a branch used in a sleep mode is configured to have a relatively high inductance with low AC losses and the higher the range of the load current assigned to a branch is the lower are the configured inductance of the inductive means and the configured DC loss.

In accordance with the objects of this disclosure a multi-phase DC-DC converter configured both to achieve fast transient response and to optimize efficiency over the load range of a DC-to-DC converter has been disclosed. The buck converter firstly comprises a node for an output voltage and controlling means. Furthermore the buck converter comprises a number of circuit branches connected in parallel, wherein a first terminal of each branch is connected to an output of the error amplifier and a second terminal of each branch is connected to the node of the output voltage, wherein each branch comprises means of generating control signal, switching means and inductive means, wherein the inductive means of each branch are configured to optimize the efficiency of each branch for a range of load currents in which the branch is used, wherein activation of one or more branches is assigned to a dedicated operation phase of the converter which is dependent upon a load current.

BRIEF DESCRIPTION OF THE FIGURES

The invention is explained below in an exemplary manner with reference to the accompanying drawings, wherein.

DETAILED DESCRIPTION

Disclosed are methods and circuits to achieve both high efficiency and fast transient response and to optimize the efficiency over the load range of a buck converter, both in sleep (PFM) and in sync (PWM) mode by combining types of inductors appropriately. In a preferred embodiment the methods and circuits are applied to a multi-phase buck converter. It should be noted that the disclosure can be applied also to multi-phase buck-boost or to multi-phase boost converters.

The buck converter of the preferred embodiment should be designed such that not all phases are used in sleep mode. The phases used in sleep mode are then populated with high inductances and/or low AC loss at light load, i.e. inductors that have very high efficiency at light load condition. This ensures the losses in sleep mode are low, and keeps overall sleep mode efficiency high.

The remaining phases are activated only in sync mode, when a load is present. The lower inductances of the inductors of these phases allow the current to ramp up quickly to meet the load, and then respond quickly to changes in the load. The higher losses in these inductors at light load condition are not significant because these phases are not used in light load. Also, as relative low inductance inductors tends to have lower direct current resistance (DCR) when compared to the higher inductance inductors, the losses at high loads are reduced, so overall efficiency at high loads is actually higher than with the higher inductance inductors.

Figure 1:
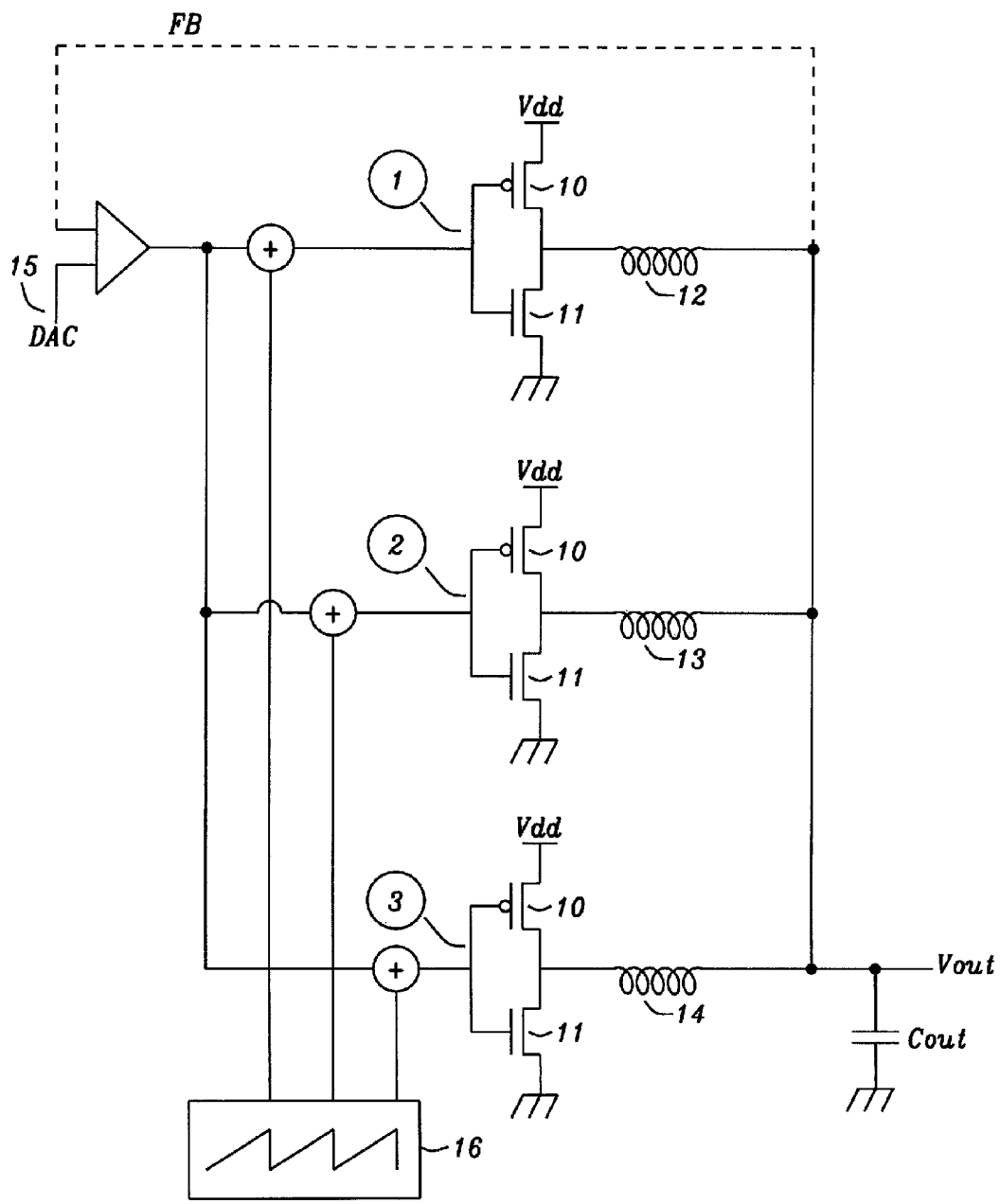
FIG. 1 shows an example buck converter according the present disclosure.

FIG. 1 shows an example buck converter according the present disclosure operating in PWM mode. In this example the buck converter has three phases (marked 1, 2 and 3). Each phase has a pair of switching devices 10, 11. Each pair of switching devices 10, 11 is connected to a specific inductor 12, 13, and 14. The output devices are typically controlled by a feedback control loop FB that compares the output voltage VOUT with a reference voltage. In a preferred embodiment the reference voltage15 is an output of a digital-to analog converter (DAC). Ramp signals from a ramp signal generator 16 are used to create a pulse-width modulated control signal to drive the switching devices 10, 11. There are different operation modes:

Preferred types of inductors are low-loss inductors as e.g. wire wound inductors, powdered metal-alloy core inductors, low-profile power inductors, in the range of 0.22 uH to 4.7 uH generally.

Operation Mode 1:

In an exemplary operation mode only phase 1 would be operated in sleep. This may be controlled using the feedback loop FB shown or by some other method (such as a low power hysteretic mode). The remaining phases (2 and 3) would be activated when the load is sufficiently high (sync mode).

The inductor 12 of phase 1 is configured to have higher inductance or to have very low AC loss. This gives very high efficiency in sleep mode at light load condition. The phases 2 and 3 are only activated at higher load current conditions, so the inductors 13 and 14 are also used.

Operation Mode 2

In this exemplary operation mode, the 3-phase buck converter of FIG. 1 can work with phase-shedding. Phase shedding means that when load demands goes down, one or more phases are shut down to improve regulator efficiency. On the other hand when load demand increases, additional phases are activated. Only phase 1 is working when the load is light. At medium load conditions only phases 1 and 2 are working together and all phases 1-3 work together only at heavy load condition. One of the main differences between operation mode 1 and operation mode 2 here is that usage of phase 1 state is not limited to sleep mode. Operation of phase 1 either in sync or sleep mode is fine in operation mode 2.

In case of load conditions between medium load and heavy load only phase 3 may be active or, with further increasing load, phases 3 and 2 may work together.

Similar to operation mode 1 in operation mode 2, the inductor 12 of phase 1 has been configured to have higher inductance and/or low AC loss. This gives better efficiency at light load current where AC loss is dominant loss.

The inductor 14 of phase 3 could also be configured to have low DC losses and low inductance, regardless of AC loss A configuration of an optimum inductor 13 for phase 2 depends on the application. If the application needs higher efficiency at heavy load, then inductor 13 for phase 2 would also be similarly configured as the inductor 14 of phase 3. This gives higher efficiency at heavy load condition, and better transient response.

If a higher efficiency at medium load is important in the application, then phase 2 inductor 13 is configured to have moderate AC loss and DC loss. Thus a higher efficiency peak at medium load condition is achieved, compared to the configuration described above targeting for heavy load conditions.

Figure 2:
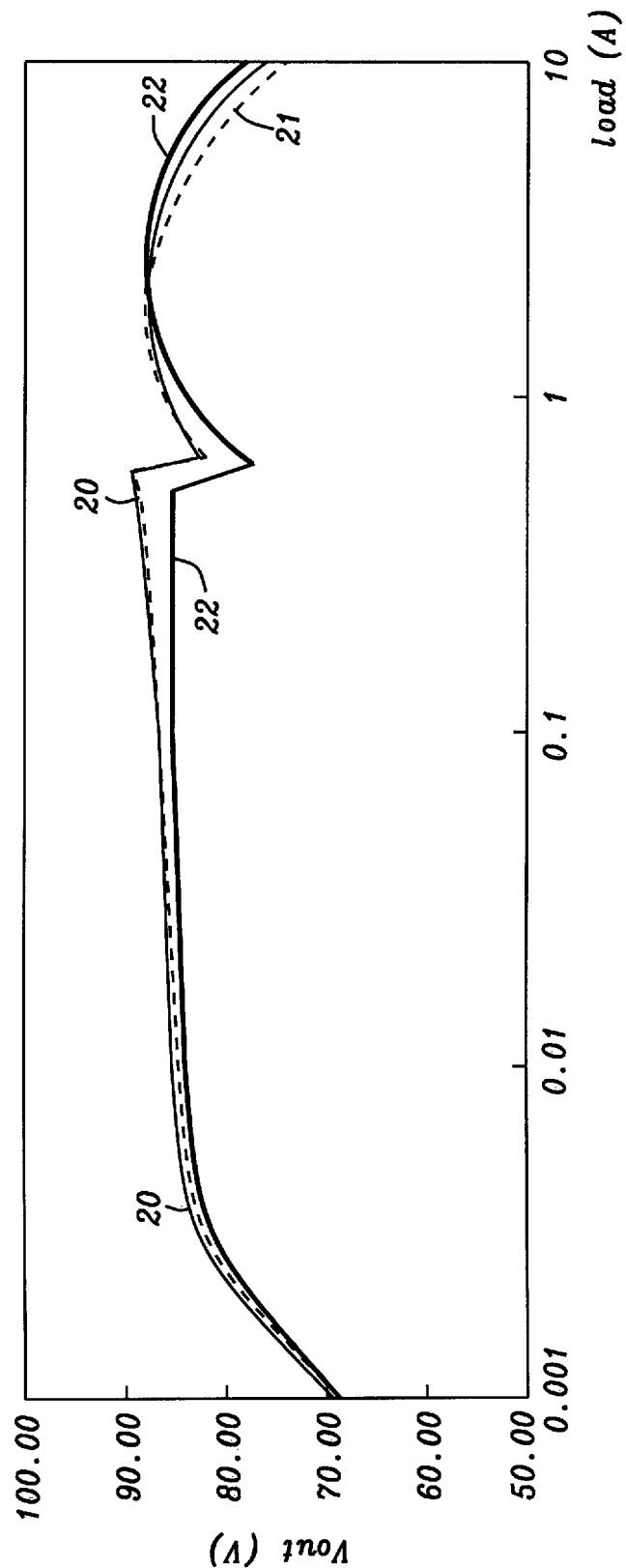
FIG. 2 shows the measured efficiency of a buck converter with all high inductance inductors, with all low inductance inductors, and then the efficiency of the proposed disclosure.

The plot of FIG. 2 shows the measured efficiency of a buck converter with all high inductance inductors, i.e. 1 µH-curve 21, with low inductance inductors, i.e. 0.47 µH-curve 22, and then the efficiency for the inductances of a preferred embodiment of the disclosure, curve 20. Curve 20 is based on a configuration wherein the sleep mode inductor 12 of phase 1 has an inductance of 1 µH and the inductors 13 and 14 have each an inductance of 0.47 µH. In curve 21 all coils have 1 µH inductance and in curve 22 all coils have 0.47 µH inductance. Curves 20 and 21 are based on a sleeping current limit of 600 mA while curve 22 is based on a sleeping current limit of 900 mA. It is obvious that Curve 20 offers benefits compared with either alternative. It should be noted that the inductance values outlined above are non-limiting examples. Other inductance values are feasible as well, as long as higher inductance values and/or low AC loss inductors are used on the phases that are used in sleep mode. The lower inductance value inductors and/or low DC loss inductors are used on the phases that are only used in higher current operations.

Figure 3:
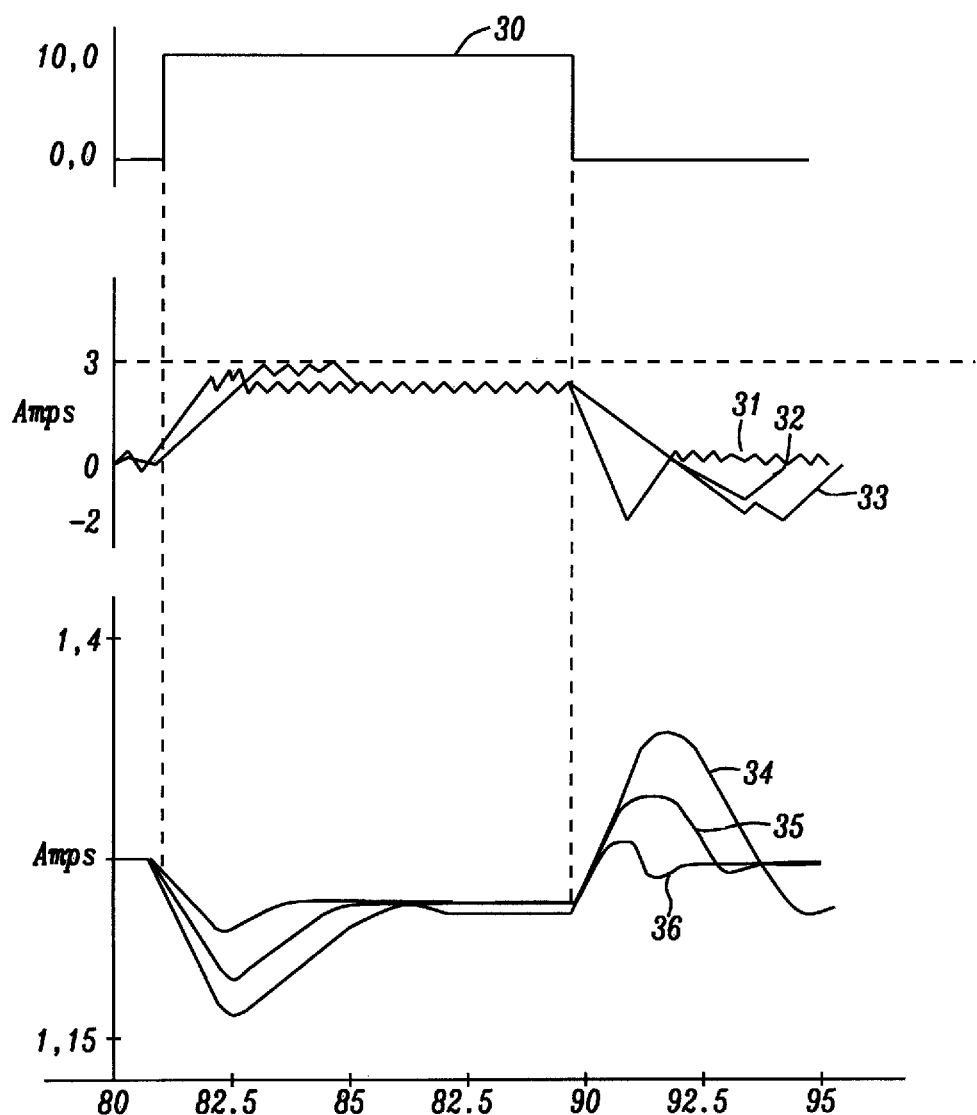
FIG. 3 shows the simulated load transient response for the three cases shown in FIG. 2.

The captures of FIG. 3 below shows the simulated load transient response for the three cases shown in FIG. 2. The top panel, curve 30, shows the applied load. The second panel shows the inductor currents, and the third panel shows the transient voltage response at the output. The middle set of curves on the third panel is for the invention detailed here.

Curve 31 represents using all small value inductors (0.47 uH). Curve 33 represents using all large inductors (1 uH) and curve 32 represents a preferred setup (0.47 uH and 1 uH).

Curve 36 represents using all small value inductors (0.47 uH). Curve 34 represents using all large inductors (1 uH) and curve 35 represents the preferred setup (1 uH for sleeping mode and 0.47 uH for the other modes).

Figure 4:
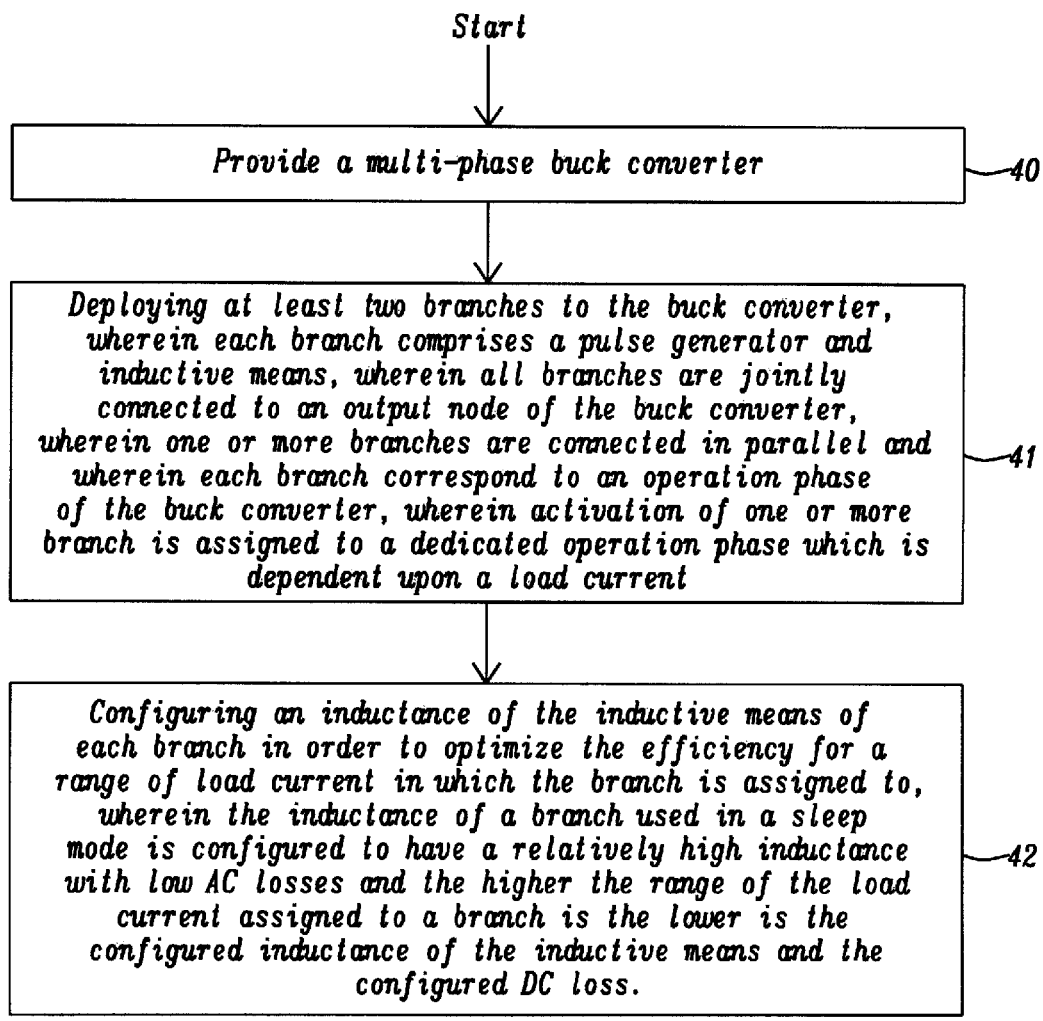
FIG. 4 shows a flowchart of a method to achieve both high efficiency and fast transient response of a buck converter and to optimize the efficiency over the load range of the buck converter.

FIG. 4 shows a flowchart of a method to achieve both high efficiency and fast transient response of a buck converter and to optimize the efficiency over the load range of the buck converter. A first step 40 depicts a provision of a multi-phase buck converter The next step 41 shows deploying at least two circuit branches to the buck converter, wherein each branch comprises a pulse generator and inductive means, wherein all branches are jointly connected to an output node of the buck converter, wherein all branches are connected in parallel and wherein one or more branches activated together to corresponds to an operation phase of the buck converter, wherein activation of one or more branches is assigned to a dedicated operation phase which is dependent upon a load current. The following step 42 illustrates configuring an inductance of the inductive means of each branch in order to optimize the efficiency for a range of load current in which the branch is assigned to, wherein the inductance of a branch used in a sleep mode is configured to have a relatively high inductance with low AC losses and the higher the range of the load current assigned to a branch is the lower are the configured inductance of the inductive means and the configured DC loss.

In summary, the disclosure teaches efficiently using multi-phase buck converters, i.e. buck converters wherein not all phases are used in sleep mode (for low load currents) or multi-phase buck converters which apply phase shedding operation. Phase shedding changes the active number of phases according to the output current.

From 2 to n inductors having inductance values may be used with each inductor configured to be optimum for the operating conditions of the phase it is attached to.

Higher inductance and/or low AC loss inductors are used with the phases that are used in sleep mode or 1-phase sync operation. The lower inductance inductors and/or low DC loss inductors are used with the phases that are only used in high current operation conditions.

In an embodiment more than two inductors in a multi-phase converter having phase shedding function are deployed. The converter may be configured as follows:

Each phase in the multi-phase converter has an inductor configured to optimize the efficiency for the range of load currents in which that phase is used. For example a buck converter may have 4 phases, the first phase (circuit branch) used only in sleep mode and having a relative high inductance inductor with low AC losses, the second phase used in sync mode at low currents and having a lower inductance inductor with low AC losses, the third and fourth phases used in sync mode at high currents and having a low inductance inductor with low DC losses.

While the invention has been particularly shown and described with reference to the preferred embodiments thereof, it will be understood by those skilled in the art that various changes in form and details may be made without departing from the spirit and scope of the invention.

What is claimed is:

1. A method to achieve both high efficiency and fast transient response of a multi-phase DC-to-DC converter and to optimize the efficiency over the load range of the DCDC converter, the method comprising the steps of:
   (1) providing the multi-phase converter;
   (2) deploying any number of more than two circuit branches to the converter, wherein each branch comprises a pulse generator and inductive means, wherein all branches are jointly connected to an output node of the converter, wherein all branches are connected in parallel and wherein one or more branches activated together correspond to an operation phase of the converter, wherein one common ramp signal generator creates control signals for each pulse generator generating pulses with a common frequency for all circuit branches; wherein activation of one or more branches is assigned to a dedicated operation phase which is dependent upon a load current; and
   (3) configuring an inductance of the inductive means of each branch in order to optimize the efficiency for a range of load current in which the branch is assigned to, wherein the inductance of one or more branches used in a sleep mode is configured to have a relatively high inductance with low AC losses and the higher is the range of the load current assigned to a branch the lower is the configured inductance of the inductive means and a configured DC loss, wherein the one or more branches, which are used in sleep mode, operate in pulse-frequency mode (PFM), wherein the one or more branches, which are used in sleep mode are using a same supply voltage as all the other branches, wherein the inductive means of the circuit branches have more than two different inductance values in order to perform phase shedding, wherein the number of active phases is changed according to the load current and wherein each phase in the multi-phase converter has an inductor configured to optimize the efficiency for the range of load currents in which that phase is used.

2. The method of claim 1, wherein phase shedding is used to operate the DCDC converter, wherein an active number of the branches used is adapted to a value of a load current wherein the active number of branches may be lower than the total number of branches.

3. The method of claim 1, wherein only one branch is used in the sleep mode, which is controlled by a controlling means, wherein the inductive means of the branch assigned to sleep mode has the highest inductance of all branches and a low AC loss.

4. The method of claim 3, wherein the controlling means is a feedback loop.

5. The method of claim 3, wherein the controlling means provides a hysteretic mode.

6. The method of claim 1, wherein the multi-phase DC-to-DC converter is a multi-phase buck converter.

7. The method of claim 1, wherein the multi-phase DC-to-DC converter is a multi-phase buck-boost converter.

8. The method of claim 1, wherein the multi-phase DC-to-DC converter is a multi-phase boost converter.

9. The method of claim 1 wherein in the sleep mode only one branch of the circuit is activated.

10. The method of claim 9 wherein in the sleep mode branch the highest inductance of all branches is deployed and in all other branches a lower inductance is deployed wherein in the other branches a same inductance is deployed.

11. The method of claim 1 wherein in heavy load mode all branches of the circuit are activated.

12. The method of claim 1 wherein the multiphase DC-to-DC converter has 4 phases, wherein a first phase is used only in sleep mode and has a relative high inductance inductor with low AC losses, a second phase is used in sync mode at low currents and having a lower inductance inductor with low AC losses than the first phase, and third and fourth phases are used in sync mode at high currents and have a lower inductance inductors with low DC losses compared to the second phase.

13. A multi-phase DC-to-DC converter configured both to achieve fast transient response to optimize efficiency over a load range of a DCDC converter comprising:
   a node for an output voltage;
   controlling means;
   a number of pulse generators, wherein one pulse generator is assigned to a circuit branch generating pulses with a common frequency for all circuit branches;
   one common ramp signal generator configured to provide ramp signals to each of said pulse generator; and
   any number of more than two of said circuit branches connected in parallel, wherein a first terminal of each branch is connected to an output of the controlling means and a second terminal of each branch is connected to the node of the output voltage, wherein each branch comprises means of generating control signals, switching means and inductive means, wherein, wherein the inductive means of the circuit branches have more than two different inductance values, wherein the inductive means of each branch are configured to optimize an efficiency of each branch for a range of load currents in which each branch is used, wherein activation of one or more branches is assigned to a dedicated operation phase of the converter which is dependent upon a load current, wherein the one or more branches, which are used in sleep mode, operate during all operation phases in pulse-frequency mode (PFM), wherein all branches, which are used in sleep mode, have a same supply voltage.

14. The multiphase converter of claim 13, wherein the multi-phase DC-to-DC converter is a multi-phase buck converter.

15. The multiphase converter of claim 13, wherein the multi-phase DC-to-DC converter is a multi-phase buck-boost converter.

16. The multi-phase converter of claim 13, which is configured to use phase shedding to operate the converter, wherein an active number of the branches used is adapted to a value of a load current wherein the active number may be lower than the total number of branches.

17. The multi-phase converter of claim 13, wherein one or two branches are used in sleep mode, wherein the inductive means of the branches assigned to sleep mode have the highest inductance of all branches and a low AC loss.

18. The multi-phase converter of claim 13, wherein the controlling means comprises a feedback loop.

19. The multi-phase converter of claim 17, wherein in sleep mode, the control signal generating means of the active branch generates a pulse frequency modulated control signal for the switching means of the active branch.

20. The multi-phase converter of claim 13, wherein in a heavy load mode all branches of the circuit are activated.

21. The multiphase converter of claim 13, wherein the controlling means comprise an error amplifier having inputs and an output, wherein a first input is coupled with the node of the output voltage, and a second input is a reference voltage.

22. The multiphase converter of claim 21, wherein the multiphase converter is further comprising a ramp signal generator providing a ramp signal to at least one of said control signal generating means, wherein said at least one of said control signal generating means receives the error amplifier output and the ramp signal and generates a pulse width modulated control signal for the switching means of the circuit branch.

23. The multiphase converter of claim 13, wherein the controlling means comprises a comparator having inputs and an output, wherein a first input is coupled with the node of the output voltage, and a second input is a reference voltage.

24. The multiphase converter of claim 13, further comprising current sensing means to sense the current in at least one of the circuit branches, wherein the control signal generating means of said at least one of the circuit branches receives the comparator output and the sensed current and generates a pulse frequency modulated control signal for the switching means of said at least one of the circuit branches.

25. The multiphase converter of claim 13, wherein the controlling means provides a hysteretic mode.

26. The multiphase DC-to-DC converter of claim 13, wherein the multiphase DC-to-DC converter has 4 phases, wherein a first phase is used only in sleep mode and has a relative high inductance inductor with low AC losses, a second phase is used in sync mode at low currents and having a lower inductance inductor with low AC losses than the first phase, and third and fourth phases are used in sync mode at high currents and have a lower inductance inductors with low DC losses compared to the second phase.

* * * * *